March 22, 1949.  F. E. FREY  2,465,016
PROCESS FOR CATALYTIC DEHYDROGENATION
Filed Sept. 5, 1945
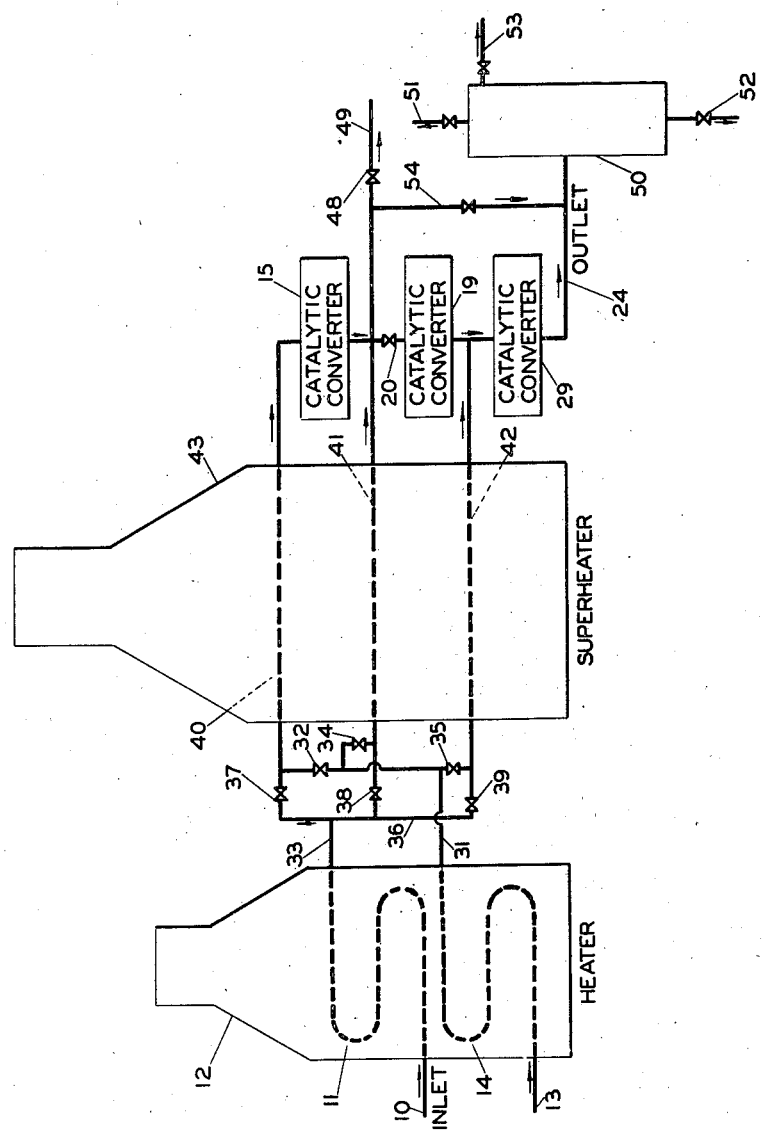
INVENTOR
F.E.FREY
BY Hudson & Young
ATTORNEYS Patented Mar. 22, 1949

2,465,016

UNITED STATES PATENT OFFICE 2,465,016

PROCESS FOR CATALYTIC DEHYDROGENATION

Frederick E. Frey, Bartlesville, Okla., assignor to Phillips Petroleum Company, a corporation of Delaware Application September 5, 1945, Serial No. 614,577

5 Claims. (Cl. 260—683.3)

This invention relates to the endothermic catalytic conversion of organic compounds, and more particularly to the catalytic dehydrogenation of low-boiling hydrocarbons of two or more carbon atoms per molecule, especially those having less than six carbon atoms per molecule. This application is a continuation-in-part of my copending application Serial No. 356,080, filed September 9, 1940, now Patent 2,418,255, which, in turn, is a contination-in-part of my copending application, Serial No. 305,549, filed November 21, 1939, now Patent 2,427,954.

Dehydrogenation reactions involve an appreciable heat of reaction, which is absorbed by the reactants, so that they are considered to be endothermic reactions. Such reactions generally do not tend to approach completion at ordinary reaction temperatures, but are in constant competition with hydrogenation reactions, which tend to approach completion at lower temperatures. As a result, at any particular operating temperature, dehydrogenation approaches a maximum, where an equilibrium exists with the reverse reaction of hydrogenation, this maximum for dehydrogenation tending to increase with increased temperatures. There are also other potential reactions which can take place at dehydrogenation temperatures, which are generally more or less undesirable. When considering the dehydrogenation of hydrocarbons, such as the dehydrogenation of paraffins to produce olefins, or diolefins, or of olefins to produce diolefins, the most desirable reaction is a simple splitting off of hydrogen to form a less saturated hydrocarbon of the same number of carbon atoms such as an olefin, or a diolefin, with a carbon-atom structure corresponding to the original hydrocarbon, and free hydrogen. A major potential concomitant reaction involves the splitting of carbon-to-carbon bonds forming two or more smaller hydrocarbons, one of which is generally less saturated than the other. Broadly this can be considered to be dehydrogenation when in its simplest form, but it has the disadvantage of resulting in a somewhat different unsaturate than is produced by simple dehydrogenation, as well as an undesirable light paraffin, or the like, and further, when such reactions continue, there results a complete breakdown of the hydrocarbon material to carbon. However, when the reaction periods are short, and reaction temperatures are not excessively high, these less desirable reactions do not necessarily predominate, and substantial yields of products resulting from simple elision of hydrogen can be obtained. In most cases this result can be most readily obtained in the presence of dehydrogenation catalysts, the most desirable of which tend to promote selective dehydrogenation reactions rather than reactions involving scission of carbon-to-carbon bonds, as well as to increase the speed of such reactions.

As just mentioned, dehydrogenation reactions are endothermic, and a considerable amount of heat must be supplied during the reaction period in order to promote the reaction. This is somewhat difficult to do under the most favorable conditions and this problem is increased to a certain extent when using dehydrogenation catalysts by the fact that most dehydrogenation catalysts are poor conductors of heat. In the past, endothermic catalytic conversion processes have generally been carried out by passing the reactant material through relatively small tubular catalyst chambers or through narrow catalyst-containing annular or equivalent zones. Catalyst chambers of these types are readily heated to a suitable temperature such that the catalyst is maintained at an appropriate reaction temperature. Many catalytic reactions in general are carried out commerically on a large scale by means of converters containing a number of such small and/or narrow catalyst containers arranged in heat-exchange relationship with a temperature-controlling and heat-supplying medium. Substantially equivalent systems in which temperature-controlling means are placed in contact with the catalyst, such as tubular members, positioned within a body or mass of catalyst and containing a liquid of suitable boiling or condensation point, or other temperature-controlling media, have also been proposed and used.

Such previously prepared catalytic conversion systems have a number of disadvantages, among which may be mentioned the high cost of manufacturing the many requisite chambers or containers; the high cost of certain widely used heat-exchange media such as mercury, diphenyl, and the like; the difficulty of making and maintaining fluid-tight connections and joints, especially in large numbers; the difficulties of charging and removing the catalyst; and the difficulty of preventing leakage of the heat-exchange medium, which like mercury, may be somewhat toxic as well as expensive.

Thermal reactions of an endothermic nature are readily carried out in continuous processes. An elongated tube coil with a rather restricted cross section can be placed within a suitable furnace, and heat can be readily supplied along the length of the tube coil while a stream of reactants is pumped through it and reaction proceeds. However, when it is desired to conduct a simple dehydrogenation such a procedure is generally not applicable, since cracking and other degradation reactions proceed to a substantial extent. An attempt to modify such simple apparatus to be used with catalysts has resulted in the complex catalyst chambers just discussed, with their attendant disadvantages.

It is an object of this invention to provide an improved process involving endothermic catalytic conversions.

Another object of this invention is to effect the catalytic dehydrogenation of hydrocarbons using simple, large masses of dehydrogenation catalyst.

A further object of my invention is to dehydrogenate hydrocarbons using a series of catalyst masses.

A still further object of my invention is to provide a simple, efficient means of supplying heat to a dehydrogenation reaction carried out in the presence of a large body of catalyst.

I have now found that by a suitable combination of heating coils for the reactants and of comparatively massive catalyst chambers I can conduct catalytic dehydrogenations in an efficient manner using comparatively large catalyst masses in relatively simple catalyst chambers. I have also found that I can effect a satisfactory dehydrogenation, especially of certain hydrocarbon materials, by a cooperative combination of thermal and catalytic dehydrogenation, using simple large masses of dehydrogenation catalyst in the catalytic step. I have further found that such large bodies of catalyst are most preferably used under stantiantially adiabatic conditions, that is, they are most preferably used in well-insulated catalyst chambers, so that little or no heat gain or loss occurs through the walls thereof during the process, and the only addition or withdrawal of heat during the process occurs with the reactant and effluent streams. The advantages of the use of such substantially adiabatic catalyst chambers are most successfully realized by the use of a series of such chambers, heating the reactant material during its passage from one chamber to another, and/or adding highly heated fresh reactant material to the stream passing from one chamber to another. My invention is particularly adapted to the production of low-boiling olefins such as ethylene, propylene, butenes and pentenes and of diolefins, such as butadiene, pentadiene, and isoprene from the corresponding more saturated hydrocarbons.

My invention is more clearly explained and disclosed in connection with the flow diagram of a process wherein it is applied. It will now be described in connection with the accompanying drawing showing a flow diagram illustrating and exemplifying a method of practicing the invention.

The drawing shows an arrangement of apparatus wherein a series of catalyst chambers or catalytic converters is used, with additions of highly heated and/or partially reacted material to the reactant stream between successive converters.

In accordance with the present invention, heat is supplied to the hydrocarbon to be dehydrogenated by means of superheated benzene in intimate admixture with said hydrocarbon. This results in a uniform supply of heat for carrying out the highly endothermic dehydrogenation reaction without the numerous disadvantages of complex apparatus hereinbefore discussed. The benzene may also be used as diluent to control the concentration of hydrocarbon reactant within the desired range. The benzene and reactant are first separately heated, admixed in desired proportions to form a reaction mixture, and the mixture then superheated to the reaction temperature. A part of the dehydrogenation may be effected non-catalytically in the superheater after which the mixture is passed to catalytic converters which embody large contact masses of catalyst in chambers which are well insulated so that the catalytic dehydrogenation is carried out under substantially adiabatic conditions. A part of the superheated reaction mixture is supplied to the catalytic conversion at points along the line of flow as, for example, between catalyst chambers or at one or a plurality of points within a catalyst chamber. The benzene is recovered from the reaction mixture, as by fractional distillation, and recycled to the process.

I have found that benzene is particularly advantageous as a source of heat for the dehydrogenation of hydrocarbons. Benzene has a high heat capacity, is not easily cracked, and is highly stable at the elevated temperatures required for dehydrogenation of aliphatic hydrocarbons. A further important advantage of benzene is that the dehydrogenation catalyst, preferably comprising chromium oxide, is not poisoned by benzene as it is by steam or carbon dioxide. Furthermore, benzene reduces the cracking of the aliphatic hydrocarbon, making the dehydrogenation more selective and efficient.

With reference to the process exemplified in the drawing, the reactant material that is to be subjected to an endothermic catalytic conversion enters the system through pipe 10, and receives an initial temperature increment in the coil 11, in heater 12, which is more often an economizer coil in the conduction part of a tube coil furnace. Benzene enters the system through pipe 13, and is preheated in coil 14. The stream of reactant material then passes through pipe 33 to manifold 36 from which lead branch pipes or tube coils 40, 41, and 42 controlled by valves 37, 38, and 39, respectively. The preheated benzene passes through pipe 31 to the tube coils 40, 41, and 42 as controlled by valves 32, 34, and 35, respectively. By means of the control valves in the hydrocarbon streams, mixtures of benzene and the reactant material in any desired proportions may be passed to the tube coils, 40, 41, and 42. These coils are located in a superheater 43, which may comprise the radiant section of the same heating system or furnace of which heaters 12 and 43 are a part. In the coils or tubes 40, 41, and 42 the temperature of the reaction mixture is raised to a thermal reaction temperature, such as between about 1000 and 1300° F. for the dehydrogenation of low-boiling hydrocarbons, and maintained at this temperature for an appreciable period of time, so that a partial reaction occurs. However, this time is so controlled and limited that the maximum extent of total conversion is not approached.

and preferably not more than 50 per cent, and still more preferably, about 20 to 40 per cent, of this maximum conversion occurs. Thus, in the dehydrogenation of paraffin hydrocarbons to form olefins, the ultimate olefin content of the effluent will generally be between about 10 and 50 volume per cent, preferably about 15 to 40 per cent and the effluent of such a thermal step should contain only about 5 to 15 per cent by volume of olefins produced by reaction in this initial step. The stream from coil 40 passes to the catalytic converter 15, where it is contacted with a suitable catalytic material for the desired endothermic reaction, preferably a mass of solid, granular catalytic material. This converter, as well as other converters used in the process, is preferably of simple construction adapted to hold a single relatively large mass of catalyst, comprising a shell and a perforated false bottom upon which the catalyst mass rests, as is known to the art, and is preferably unheated and well insulated against heat loss. In one preferred form of operation, the maximum total conversion possible at the reaction temperature employed is not attained in converter 15, and the effluent thereof is passed into contact with a second mass of catalyst in converter 19. A portion of the initial charge stock-benzene mixture heated in coil 41 to a temperature appreciably above the temperature of the effluent of converter 15 is added to this effluent in a substantial amount, so as to raise the temperature of the total stream, which is then passed into contact with the catalyst mass in converter 19. In a similar manner, the effluent of converter 19 may have added to it a hotter portion of the initial charge stock-benzene mixture which has been heated in coil 42, and the combined material is passed into contact with a catalyst mass in converter 29. The effluent of 29 passes through outlet 24 for any desired subsequent treatment, such as fractionation and/or polymerization, and the like. In the appartus shown, the effluent is passed to a separating means 50, where a separation may be effected between light hydrogen-containing gases which are removed through valved conduit 51 and a stream containing benzene and unsaturated aliphatic hydrocarbons which is recovered through valved conduit 52. The stream removed through line 52 may be separated in any suitable manner, as by fractional distillation, to recover benzene therefrom. The benzene is recycled to the heating coil 14 of furnace 12. If desired, the separation means may include known selective separation steps whereby desired unsaturates are separated from more-saturated components, which are discharged through valved conduit 53. These latter may be recycled if desired.

In one modification of my invention, the material is heated in tubes 40, 41, and 42 to an extent sufficient to cause a substantial amount of uncatalyzed reaction or conversion, preferably less than one-half of the desired total amount of conversion as hereinabove stated, to occur before the material comes into contact with the catalytic contact masses in the catalytic converters 15, 19, and 29. It is preferable that superheating tubes 40, 41, and 42 be not immoderately extended and that they be arranged in parallel, as shown, as the desired objective is to obtain a high temperature in the reaction mixture rather than a high degree of thermal, uncatalyzed reaction. Furthermore, the interconnecting tubes between superheating tubes 40, 41, and 42 and converters 15, 19, and 29 are preferably as short as practicable so that the maximal proportion of sensible heat may be utilized in the subsequent endothermic catalytic conversion. Although in some cases it may be permissible to recombine the superheating coils so that all the reaction mixture must pass through each of the catalytic converters in turn, it is usually preferable to make use of the intermediate addition of freshly highly heated and partially cracked reaction mixture as thereby the different catalytic contact masses are more readily maintained at appropriate reaction temperatures; in some cases, a single superheating coil and/or a single catalyst mass may be employed, the effluent from the coil being distributed to the inlets of serially arranged catalyst zones. When a single catalyst mass is used, it is preferably placed in a somewhat elongated catalyst chamber with portions of heated charge being added to mix with the reactants at various points along the flow through the catalyst mass. The temperatures and rates of flow in superheating tubes 40, 41, and 42 may be regulated in any suitable manner, resulting in a high flexibility of control of reaction conditions in converters 15, 19, and 29. After passing through the last converter, such as converter 29, the converted hydrocarbon material leaves the system through outlet 24. As a simple modification, a single heating and non-catalytic reaction coil and a single catalyst mass may be used. Thus, the entire charge may be passed through coil 40, wherein a partial uncatalyzed reaction takes place, to chamber 15 and the effluent of chamber 15 is then passed directly from the system through outlet 49 and valve 48, valve 20 being closed, for further treatment as may be desired, or it may be passed through conduit 54 to separating means 50.

One very desirable modification of this invention employs varying mixtures of benzene and charge stock to the superheating tubes 40, 41, and 42 by suitable adjustment of valves 32, 34, and 35, and valves 37, 38, and 39. Preferably the proportions of benzene to hydrocarbon reactant progressively increase along the line of flow through the catalyst zone or zones. Thus, as illustrated in the drawing, higher proportions of benzene to reactant may be admitted to superheater tubes 41 and 42 than to superheater tube 40. Obviously superheater tube 42 or tubes 41 and 42 may be operated with benzene alone as feed to be injected between stages in the catalytic converters.

A feature illustrated and embodied by the arrangement shown in the drawing is the step of thermally dehydrogenating and/or cracking a part of a hydrocarbon starting material for the purpose of enhancing its over-all stability to further cracking, for the purpose of increasing the temperature of the reaction mixture, and for the purpose of making the reaction mixture carry a relatively large amount of sensible heat into the subsequent catalytic conversion wherein this sensible heat is then available and used as endothermic heat of reaction. The attainment of these objectives leads to an over-all economy of heat and an over-all efficiency of operation not obtained by either thermal dehydrogenation or catalytic dehydrogenation alone, nor by aggregations of similar but separately conducted thermal and catalytic steps. A generally suitable amount of partial cracking is 1 to 15 per cent, and a preferred amount is 5 to 10 per cent. Too large an extent of cracking, particularly of easily degraded hydrocarbons such as normal butane, or normal pentane, is undesirable because of excessive loss to methane and other economically inferior products. But in certain cases, such as that of isobutane, which is thermodynamically more resistant to degradation and is more cleanly thermally dehydrogenated than normal butane, a larger amount of thermal decomposition, such as 15 to 30 per cent or more, is not only feasible but sometimes highly advantageous.

The arrangement illustrated in the drawing is especially advantageous for use with partially spent or partly deteriorated chromium oxide-containing catalysts capable of withstanding the high temperature in question. In any case the suitability of any particular catalyst for use in this arrangement may be readily determined by trial. In some instances the efficiency of utilization of the superheat may be bettered by the use of a catalyst of high-temperature type and, immediately downstream, of a catalyst of low-temperature type capable of effecting dehydrogenation at the temperature, partly lowered by reaction, at which the hydrocarbon stream leaves the high-temperature catalyst.

It will of course be appreciated that in the embodiment shown in the drawing the single preheating coil 11 through which all the charge is passed for the separate coils 40, 41, and 42 may be either completely eliminated, or replaced by separate preheating coils for each of the individual superheating coils.

The simple catalytic dehydrogenation of isobutane produces predominantly isobutylene which, when polymerized, yields isooctenes, or which, when reacted with an isoparaffin such as isobutane or isopentane by alkylation, produces isooctanes or isononanes, as the case may be. While these materials are very desirable as constituents of motor fuels, they do not in themselves constitute desirable modern gasolines because of their restricted boiling ranges, such as determined by the method identified as A. S. T. M. procedure D 86—38. I have found that, when it is desirable to produce a motor fuel from isobutane directly, a more desirable charge stock can be prepared by my process since apperciable amounts of propylene are also produced along with isobutylene. When the resulting olefin mixture is subjected to catalytic polymerization, as in my above-identified copending application Serial No. 305,549, this propylene also enters into reaction so that a polymer product results which is more nearly a balanced motor fuel from the point of view of distillation range and volatility. A similar result is obtained when the olefins so produced are charged to an alkylation process and caused to react with a material such as isobutane or isopentane in the presence of concentrated sulfuric acid, sodium chloroaluminate, concentrated hydrofluoric acid, or the like. Likewise, when olefins resulting from the dehydrogenation of ethane and/or propane are to be reacted with heavier paraffins to produce a motor fuel, as in my application Serial No. 82,954, filed June 1, 1936, which issued as Pat. No. 2,270,700, the practice of this modification of my invention results in the economical production of an olefin mixture containing appreciable amounts of both ethylene and propylene, which enter into the alkylation reaction to produce a saturated product with a well-balanced distillation range.

However, this feature is not so readily applied to hydrocarbons higher boiling than isobutane, such as normal butane, normal pentane and isopentane, and the like. For example, when normal butane is subjected to extensive uncatalyzed dehydrogenation, a considerable part of the conversion consists of the formation of ethane and ethylene, and methane and propylene, and only about 10 per cent of the reaction forms free hydrogen and butylenes. The ethane and methane represent a loss of a considerable part of the original hydrocarbon material, while the ethylene does not readily enter into subsequent reactions under the conditions most favorable for the reaction of normal butylenes produced directly from normal butane by simple catalytic dehydrogenation. A similar situation exists with respect to higher-boiling hydrocarbons and hydrocarbon fractions. For these materials a different modification of my invention, which includes the use of two or more catalytic converters, with intermediate introduction of highly heated reactant material, which nevertheless is substantially unconverted, is more to be preferred. With such a modification, the charge stock is very rapidly heated to a temperature in or near the range of thermal conversion and is not retained for a long period at this temperature but is immediately passed into contact with a catalyst which will promote the desired simple dehydrogenation rather than allowing scissions of carbon-to-carbon bonds to take place to an appreciable extent. Such a modification is particularly adapted to the production of butadiene, pentadiene, isoprene, and the like from the corresponding more-saturated hydrocarbons.

In these modifications the lengths of the heating periods are not readily defined in terms of seconds, since the effects of maintaining the charge at any temperature for any period of time is dependent on the temperature, pressure, and the hydrocarbon material. Such effects are well known to the art, and can be readily determined by trial by one skilled in the art for any particular instance.

The use of a chromium oxide gel catalyst for the dehydrogenation of hydrocarbons has been disclosed by Huppke and Frey in U. S. Patent No. 1,905,383. Other chromium oxide-containing catalysts suitable for dehydrogenation, especially of hydrocarbons, have been disclosed by Frey and Huppke in U. S. Patent No. 2,098,959, and the following applications: Morey, Ser. No. 113,091, filed November 27, 1936, now Patent No. 2,233,320; Matuszak and Morey, Ser. No. 173,708, filed November 9, 1937, now Patent No. 2,294,414; and Morey and Frey, Ser. No. 173,709, filed November 9, 1937, Patent No. 2,312,572. In general, these latter catalysts comprise unglowed chromium oxide obtained by nonspontaneous thermal decomposition of chromium compounds such as hydrated chromic oxide, ammonium-containing salts of chromic acid, and the like. These catalysts are preferred when it is not necessary to use excessively high dehydrogenation temperatures and/or when the process is operated to produce appreciable quantities of diolefins in the effluent with a minimum of secondary reactions. At other times other catalysts are cheaper and entirely suitable, such as granular synthetic alumina, or bauxite or other aluminiferous natural materials, with or without promoters such as compounds of chromium, zirconium, molybdenum, titanium, and the like.

*Example*

Benzene and a refinery fraction comprising mainly normal butane are passed through separate coils in a preheating furnace. The preheated butane is then divided into three streams. To each of these streams is then added a sufficient amount of the preheated benzene to produce a stream containing approximately equal parts by volume of benzene and butane. The three benzene-butane streams are then passed through coils in a superheater in which they are rapidly heated to about 1200° F. The extent of thermal decomposition is unusually low; only about 3 per cent of the butane and substantially none of the benzene is decomposed.

The first of the superheated benzene-butane streams, corresponding to that in pipe 40 in the drawing, is passed directly to the first of three catalyst chambers connected in series. Each chamber is an insulated cylinder containing a mixture of 90 per cent alumina ($Al_2O_3$) and 10 per cent chromia ($Cr_2O_3$). To the effluent from the first chamber is added the second superheated benzene-butane stream, which corresponds to that in pipe 41 in the drawing, and the resultant mixture is passed to the second chamber. To the effluent from the second chamber is added the third superheated benzene-butane stream, which corresponds to that in pipe 42 in the drawing, and the resultant mixture is passed to the third chamber. The overall space velocity through the three catalyst chambers is 800 gaseous volumes (STP) per volume of catalyst per hour, and the resultant temperature drop across the three chambers is only about 150 Fahrenheit degrees.

The dehydrogenated effluent is passed to a deethanizer, from which light gases, chiefly hydrogen and hydrocarbons boiling below the boiling point of propylene, are removed as an overhead fraction. The products of the dehydrogenation process, chiefly butenes, are recovered by solvent extraction of the deethanizer kettle product and subsequent stripping. Unconverted normal butane and benzene are recovered by fractionation and recycled as separate streams to the preheating furnace.

The yield of butenes, based on normal butane charged is approximately 25 per cent.

I claim:

1. A process of dehydrogenating $C_2$—$C_5$ paraffin and olefin hydrocarbons which comprises admixing benzene with a portion of the hydrocarbons to be dehydrogenated to form a first reaction mixture, heating said first reaction mixture to a temeperature between about 1000° and about 1300° F. under conditions which effect substantially non-catalytic dehydrogenation of said hydrocarbons in an amount between about 5 and about 15 per cent by volume, contacting a large mass of particulate solid dehydrogenation catalyst in an unheated insulated first catalyst zone with the substantially uncooled effluent from said non-catalytic dehydrogenation, admixing benzene with a second portion of said hydrocahbons to form a second reaction mixture richer in benzene than said first reaction mixture, heating said second reaction mixture to a temperature between about 1000° and about 1300° F. but above the temperature of the effluent from the first catalyst zone, admixing said second reaction mixture at aforesaid temperature with the substantially uncooled effluent from said first catalyst zone, contacting a large mass of particulate solid dehydrogenation catalyst in an unheated and insulated second catalyst zone with the total stream thus formed at the resulting temperature so as to further catalytically dehydrogenate said hydrocarbons, admixing benzene with a third portion of said hydrocarbons to form a third reaction mixture richer in benzene than said second reaction mixture, heating said third reaction mixture to a temperature between about 1000° and about 1300° F. but above the temperature of the effluent from said second catalyst zone, admixing said third reaction mixture at aforesaid temperature with the effluent from said second catalyst zone, and contacting a large mass of particulate solid dehydrogenation catalyst in an unheated and insulated third catalyst zone so as to further catalytically dehydrogenate said hydrocarbons.

2. The process of claim 1 in which the total dehydrogenation effected is in the range of 15 to 40 per cent by volume.

3. A process of dehydrogenating $C_2$—$C_5$ paraffin and olefin hydrocarbons which comprises admixing benzene with a portion of the hydrocarbon to be dehydrogenated to form a first reaction mixture, heating said first reaction mixture to a temperature between about 1000° and about 1300° F. under conditions which effect substantially non-catalytic hydrogenation of said hydrocarbon in an amount between about 5 and about 15 per cent by volume, contacting a large mass of particulate solid dehydrogenation catalyst in an unheated insulated first catalyst zone with the substantially uncooled effluent from said non-catalytic dehydrogenation, admixing benzene with a second portion of said hydrocarbon to form a second reaction mixture richer in benzene than said first reaction mixture, heating said second reaction mixture to a temperature between about 1000° and about 1300° F. but above the temperature of the effluent from the first catalyst zone, admixing said second reaction mixture at aforesaid temperature with the substantially uncooled effluent from said first catalyst zone, and contacting a large mass of particulate solid dehydrogenation catalyst in an unheated and insulated second catalyst zone with the total stream thus formed at the resulting temperature so as to further catalytically dehydrogenate said hydrocarbon.

4. The process of claim 3 in which the total dehydrogenation effected is in the range of 15 to 40 per cent by volume.

5. A process for dehydrogenating $C_4$ paraffin and olefin hydrocarbons which comprises admixing benzene with a portion of the hydrocarbon to be dehydrogenated to form a first reaction mixture, heating said first reaction mixture to a temperature between about 1000 and 1300° F. under conditions which effect substantially non-catalytic dehydrogenation of said hydrocarbon in an amount between about 5 and 15 per cent by volume, contacting a large mass of particulate solid dehydrogenation catalyst in an unheated insulated first catalyst zone with the substantially uncooled effluent from said non-catalytic dehydrogenation, admixing benzene with a second portion of said hydrocarbon to form a second reaction mixture richer in benzene than said first reaction mixture, heating said second reaction mixture to a temperature between 1000 and 1300° F. but above the temperature of the effluent from the first catalyst zone, admixing said second reaction mixture at aforesaid temperature with the substantially uncooled effluent from said first catalyst zone, contacting a large mass of particulate solid dehydrogenation catalyst in an unheated and insulated catalyst zone with the total stream thus formed at the resulting temperature so as to further catalytically dehydrogenate said hydrocarbon, admixing benzene with a third portion of said hydrocarbon to form a third reaction mixture richer in benzene than said second mixture, heating said third reaction mixture to a temperature between 1000 and 1300° F. but above the temperature of the effluent from said second catalyst zone, admixing said third reaction mixture at aforesaid temperature with the effluent from said second catalyst zone, contacting a large mass of particulate solid dehydrogenation catalyst in an unheated and insulated third catalyst zone so as to further catalytically dehydrogenate said hydrocarbon, and maintaining the total dehydrogenation effected within the range of 15 to 40 per cent by volume.

FREDERICK E. FREY.

REFERENCES CITED

The following references are of record in the file of this patent:

UNITED STATES PATENTS

| Number | Name | Date |
|---|---|---|
| 2,184,235 | Groll et al. | Dec. 19, 1939 |
| 2,315,107 | Chickinoff et al. | Mar. 30, 1943 |
| 2,349,045 | Layng et al. | May 16, 1944 |
| 2,367,621 | Schulze et al. | Jan. 16, 1945 |
| 2,418,255 | Frey | Apr. 1, 1947 |

OTHER REFERENCES

Dement' eva et al., Chem. Abs., vol. 32, 1646 (1938).

Shiomi et al., Jour. of the Soc. Chem. Ind., Japan, Supp. Binding, vol. 43, page 451B (1940).

Certificate of Correction

Patent No. 2,465,016.

March 22, 1949.

FREDERICK E. FREY

It is hereby certified that errors appear in the printed specification of the above numbered patent requiring correction as follows:

Column 7, line 45, for "apperciable" read *appreciable*; column 9, line 8, for the word "law" read *low*; column 10, lines 24 and 25, claim 3, for "hydrogenation" read *dehydrogenation*;
and that the said Letters Patent should be read with these corrections therein that the same may conform to the record of the case in the Patent Office.

Signed and sealed this 4th day of October, A. D. 1949.

[SEAL]

THOMAS F. MURPHY,
*Assistant Commissioner of Patents.*